United States Patent [19]
Bekanich

[11] Patent Number: 5,898,508
[45] Date of Patent: Apr. 27, 1999

[54] APPARATUS FOR PRODUCING MULTI-DIMENSIONAL IMAGES OR REPRODUCTIONS OF THREE DIMENSIONAL OBJECTS

[76] Inventor: Joseph A. Bekanich, 296 Wright Ave., Kingston, Pa. 18704

[21] Appl. No.: 08/939,160

[22] Filed: Sep. 29, 1997

Related U.S. Application Data

[63] Continuation of application No. 08/490,176, Jun. 14, 1995, abandoned, which is a continuation-in-part of application No. 08/188,905, Jan. 31, 1994, Pat. No. 5,450,173, which is a continuation-in-part of application No. 08/073,487, Jun. 9, 1993, abandoned.

[51] Int. Cl.[6] .................................................. H04N 1/04
[52] U.S. Cl. ........................................ 358/474; 358/475
[58] Field of Search ................................ 358/474, 475, 358/482, 483, 487, 491, 492, 494, 496, 497, 479, 493, 500, 501, 505, 509; 355/67, 68, 82, 84, 231, 233, 234, 235, 52; 382/286, 315, 318, 319, 312, 154; 430/31; 250/234, 236, 559.22, 559.23

[56] References Cited

U.S. PATENT DOCUMENTS

| | | |
|---|---|---|
| 4,302,097 | 11/1981 | Chlestil ..................................... 355/52 |
| 4,454,210 | 6/1984 | Ariyama et al. ........................... 430/31 |
| 4,893,196 | 1/1990 | Koshiyouji et al. ..................... 355/474 |
| 4,933,773 | 6/1990 | Shiota et al. ............................ 358/302 |
| 5,119,212 | 6/1992 | Mori ........................................ 358/474 |
| 5,455,655 | 10/1995 | Hicks ........................................ 355/67 |
| 5,539,485 | 7/1996 | White ........................................ 354/76 |

Primary Examiner—David K. Moore
Assistant Examiner—Jerome Grant, II
Attorney, Agent, or Firm—David A. Tamburro

[57] ABSTRACT

Apparatus for producing multi-dimensional reproductions of a three-dimensional object. The novel system includes an illumination device, for housing a three-dimensional object, adapted to overlie the reproduction surface of a scanner or image reading device capable of reading an image from light reflected from a three-dimensional object. The scanner or image-reading device produces electrical signals representative of images read directly from the three-dimensional object and supplies electrical signals representing that image to an external apparatus such as a computer or computer-controlled apparatus from which multi-dimensional reproductions can be produced in the form of a three-dimensional picture on a monitor or screen, a three-dimensional printout from a printer, or a three-dimensional part from suitable computer controlled machinery.

31 Claims, 7 Drawing Sheets

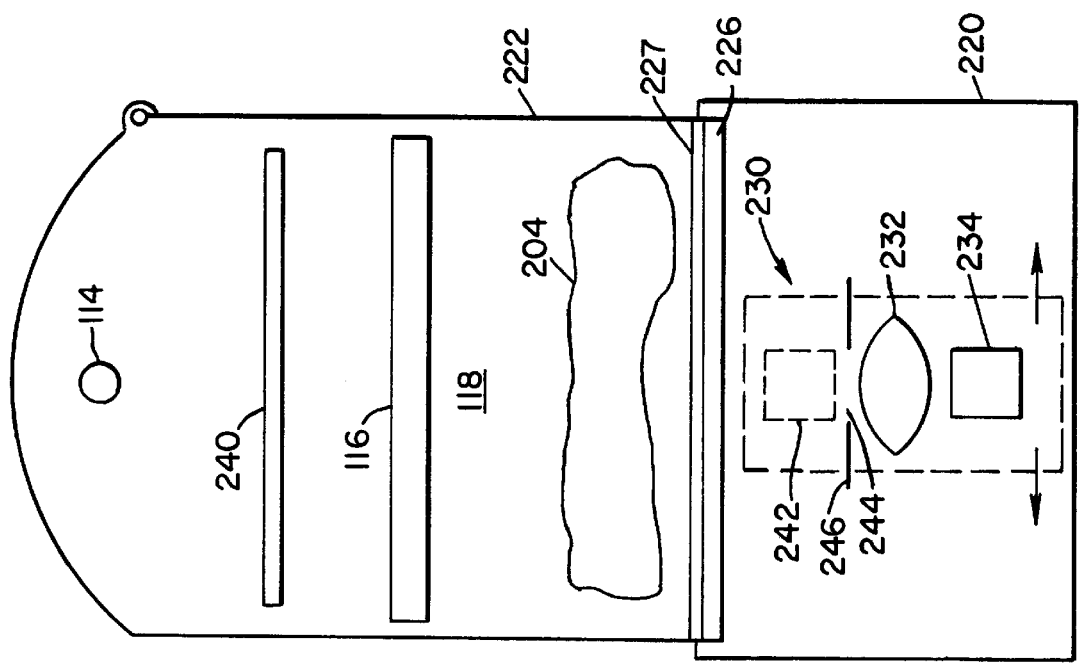
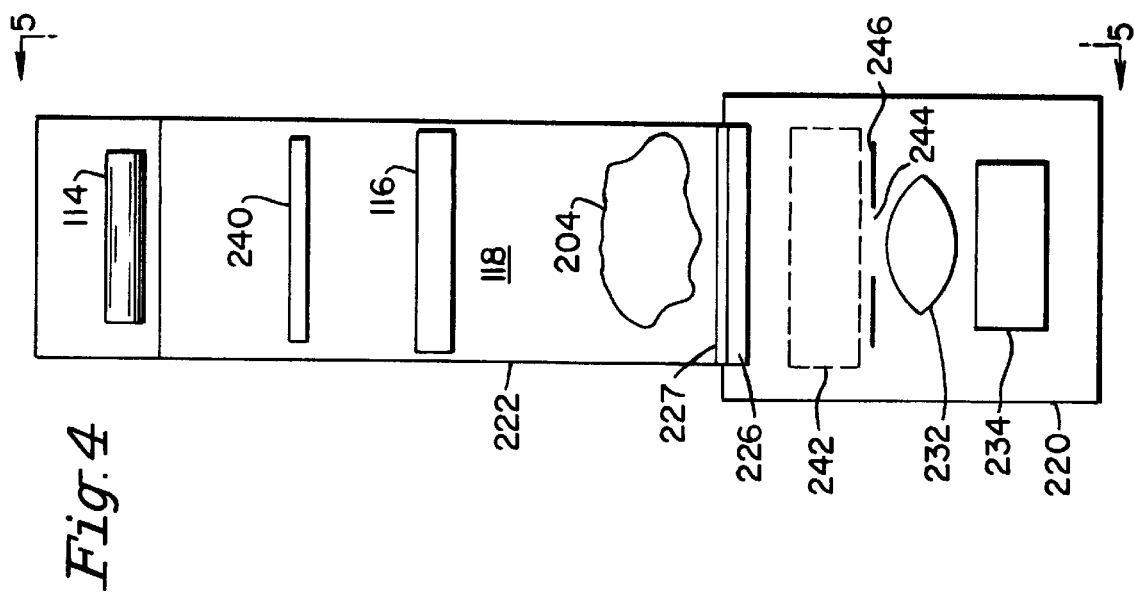

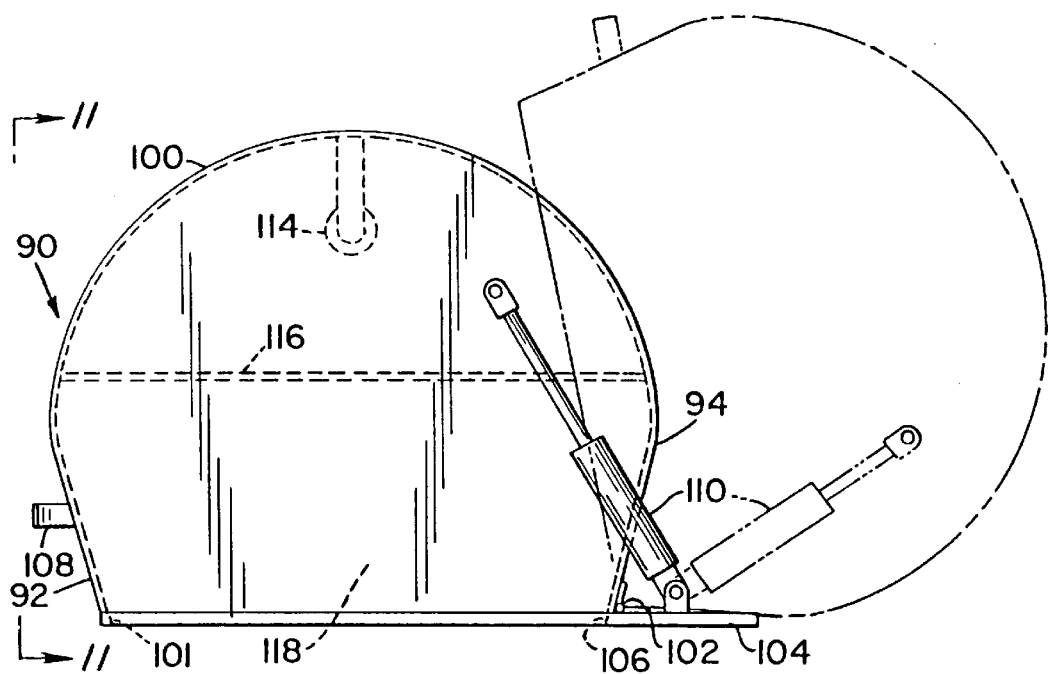
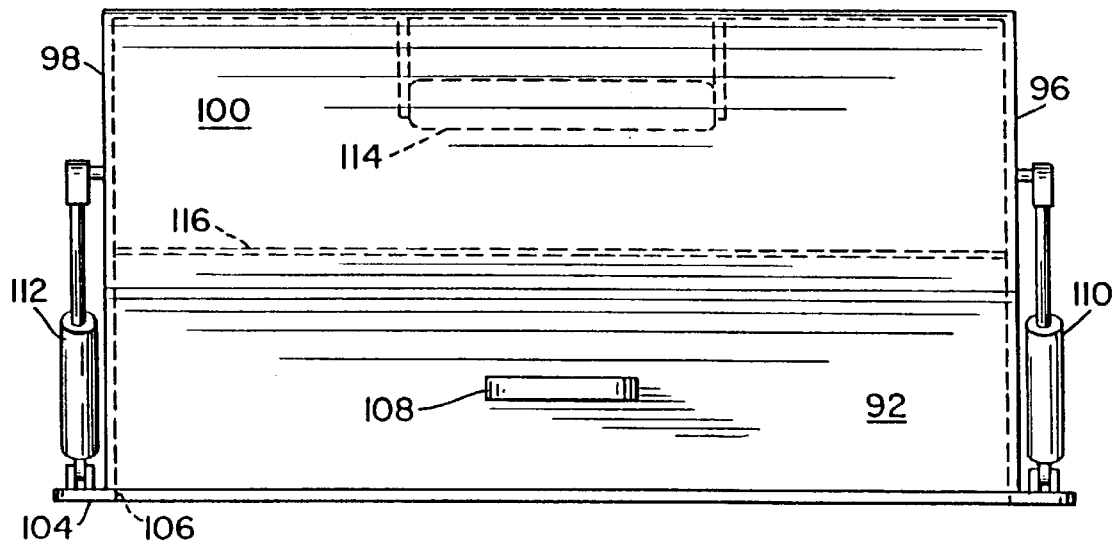

APPARATUS FOR PRODUCING MULTI-DIMENSIONAL IMAGES OR REPRODUCTIONS OF THREE DIMENSIONAL OBJECTS

RELATED APPLICATIONS

This application is a continuation of application No. 08/490,176 filed Jun. 14, 1995, now abandoned, which is a continuation-in-part of application Ser. No. 08/188,905, filed Jan. 31, 1994, now U.S. Pat. No. 5,450,173 which is a continuation-in-part of application Ser. No. 08/073,487, filed Jun. 9, 1993, now abandoned.

BACKGROUND OF THE INVENTION

This invention relates generally to apparatus for producing multi-dimensional reproductions of a three-dimensional object, and more particularly, to a novel reproduction system including a scanner or image reading device capable of reading an image from light reflected from a three-dimensional object and of generating and supplying electrical signals representing that image to an external apparatus such as a computer.

Systems which are currently in use for producing images or reproductions from three-dimensional objects are very expensive and time consuming, and therefore, are not practical or cost effective for many potential users. In many applications, a series of two-dimensional drawings or photographs are first made of three-dimensional objects, and then each of those drawings is passed through a conventional flat-bed scanner which then sends signals to a computer. Through suitable software various two or three-dimensional images may be developed on a monitor screen and/or printed out by a conventional printer.

Other prior art imaging processes employ cameras which rotate slowly about a three-dimensional object and signals from those cameras are fed into suitable computers to produce two or three-dimensional images of the three-dimensional object. Still other systems such as a Cyberware 3-D digitizer employ laser and video based technology to scan a three-dimensional object and then feed that information to suitable computer operated equipment to produce two or three-dimensional reproductions of the three-dimensional object. The signal information may also be sent to an automated milling machine which may create a physical reproduction of the three-dimensional object. Although this system is highly sophisticated and accurate, it is very expensive and, as a practical matter, is not affordable to many users.

SUMMARY OF THE INVENTION

Accordingly, a primary object of the invention is to provide a novel imaging or reproduction system which includes a scanner capable of reading an image of light reflected from a three-dimensional object and of generating electrical signals representing that image.

A further object of the invention is to provide the above novel system wherein the scanner includes an illumination image generating device adapted to overlie the usual glass reproduction surface of the scanner, the illumination device defining a chamber within which a three-dimensional object is housed.

Still another object of the invention is to provide the above novel imaging system wherein the imaging signals produced by the scanner are delivered to computer operated apparatus which produces two or three-dimensional images or reproductions of the three-dimensional object being scanned.

A further object of the invention is to provide the above novel imaging system which incorporates the duplicating or illumination device illustrated in copending application Ser. No. 08/188,905, and original application Ser. No. 08/073,487, into the scanner component of the system and which enables that scanner to produce electrical signals representative of images read directly from a three-dimensional object. The signals are then supplied to computer controlled apparatus from which multi-dimensional reproductions can be produced in the form of a three-dimensional picture on a monitor screen, a three-dimensional printout from a printer, a three-dimensional part from suitable computer controlled machinery, and so on.

Other objects and advantages of this invention will become apparent from reading the following detailed description of the invention wherein reference is made to the accompanying drawings in which like numerals indicate like elements.

BRIEF DESCRIPTION OF THE DRAWINGS

FIG. 4 is a schematic end view representation of the imaging system of the invention including the scanner and illumination device;

FIG. 5 is a schematic view of the imaging system taken along line 5—5 of FIG. 4;

FIGS. 6–14 correspond to FIGS. 1–9, respectively, illustrated in application Ser. No. 08/188,905.

FIG. 6 is a general right perspective view of one embodiment of the duplicating or illumination device which may be used with the scanner of FIG. 1;

FIG. 7 is a partially fragmented sectional view taken along line 7—7 of FIG. 6 with the dome in its closed position;

FIG. 8 is a bottom plan view of the illumination device illustrated in FIG. 6;

FIG. 9 illustrates a clear gel pad used to support odd shaped items in place on the transparent bottom plate of the device of FIG. 6;

FIG. 10 is a side elevation view of a second embodiment of the illumination device which may be used with the scanner of FIG. 1;

FIG. 11 is a front elevational view taken along line 11—11 of FIG. 10;

FIG. 12 is a side elevational view of a third embodiment of the illumination device;

FIG. 13 is a side elevational view taken along line 13—13 of FIG. 12;

FIG. 14 is a side elevational view of another embodiment of the illumination device similar to FIG. 12 but having a different-shaped dome or lid.

DETAILED DESCRIPTION OF THE INVENTION

Figure 1:
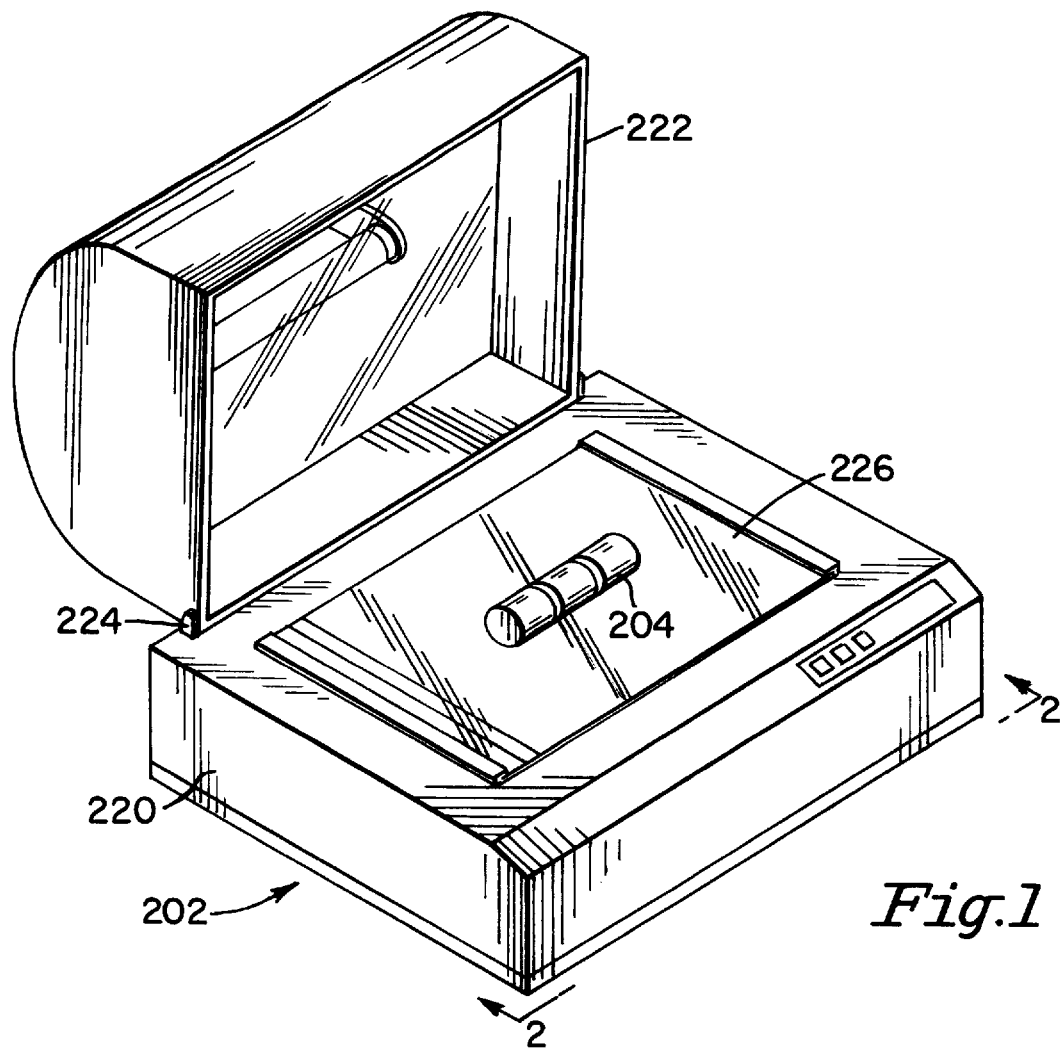
FIG. 1 is a generally perspective schematic view of an image reading apparatus or flat-bed scanner constructed according to the invention, illustrating the duplicating or illumination device in a raised position.
Figure 2:
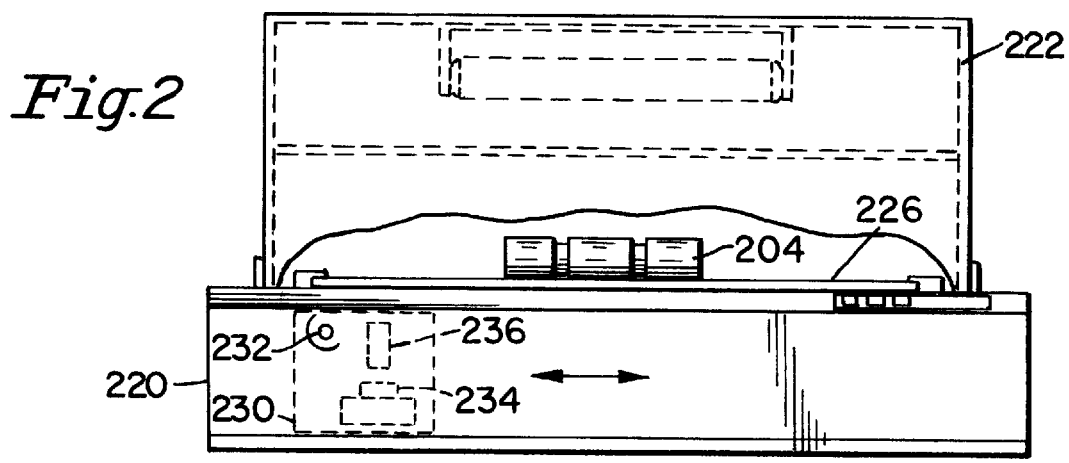
FIG. 2 is a fragmentary side view taken generally along line 2—2 of FIG. 1 schematically illustrating the internal structure of the scanner and showing the duplicating or illumination device resting in overlying operative relationship with the transparent reproduction surface of the scanner.
Figure 3:
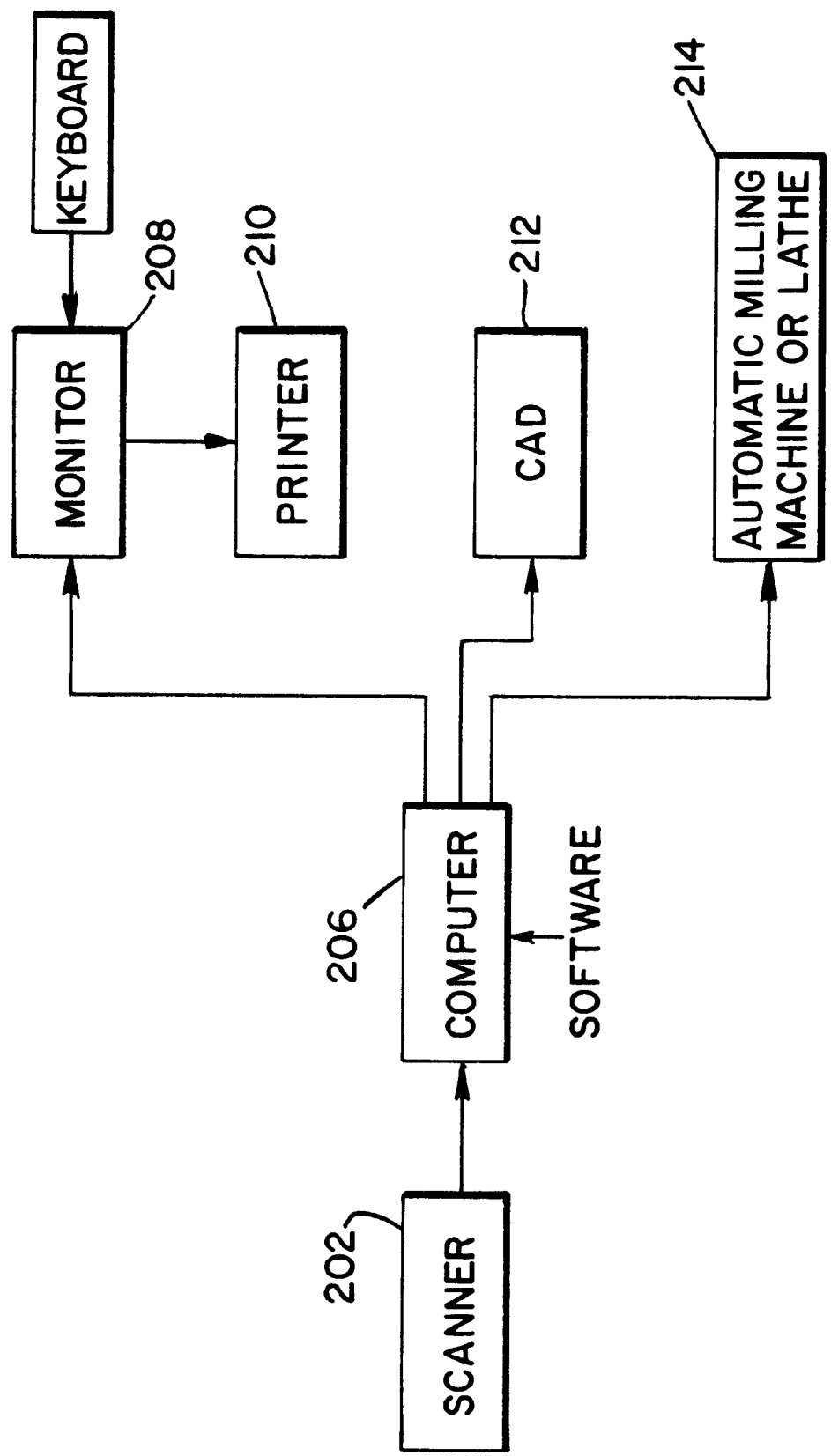
FIG. 3 is a schematic diagram illustrating an imaging system including the scanner of FIGS. 1 and 2 used in conjunction with various other computer controlled components to produce two or three-dimensional reproductions of a three-dimensional object being scanned by the scanner.

Referring now to FIGS. 1–3 of the drawings, the novel imaging or reproduction system 200 of the invention includes a novel image-reading device or scanner 202 capable of reading images from a three-dimensional object 204. Scanner 202 produces electrical signals which are representative of the images read from object 204 and delivers those signals to a conventional computer 206, which, through suitable operating software, enables a conventional monitor 208 and/or printer 210 to produce two or three-dimensional images or displays on the screen of the monitor or two or three-dimensional pictures from the printer 210. Computer 206 may also deliver signals to a computer-aided-design (CAD) machine 212, which may produce two or three dimensional drawings of object 204. As another alternative, computer 206 may deliver signals directly to an automatic machine such as a milling or lathe machine by which a duplicate part of object 204 may be produced to scale, or alternatively, may be produced to an enlarged or a reduced scale, depending on the characteristics of the software.

The novel scanner system 202 illustrated in FIGS. 1, 2, 4 and 5 comprises a conventional flat-bed scanner 220, with its usual flat cover replaced by a novel illumination or duplicating box 222 in the form, for example, of a cover pivoted at 224 to the frame of the scanner 220, and adapted to be pivoted downwardly in an overlying position with respect to the glass reproduction surface 226 of scanner 220 resting on gasket 227 surrounding surface 227 with the three-dimensional object 204 housed within a chamber or theatre 118 within box 222.

Scanner 220 includes the usual image reading unit 230 having a lamp and lens 232 for illuminating object 204 from underneath the glass surface 226, a photoelectric converter 234 and an optical system 236 for guiding the light reflected from object 204 to converter 236 in conventional fashion. The whole imaging unit 230 travels back and forth underneath surface 226 (FIG. 5) to derive image information representative of object 204 and converter 234 converts the light images reflected from object 204 into electrical signals representing those images. As shown in FIG. 3, those output signals from scanner 202 are then delivered to suitable conventional computer apparatus 206 and are processed to perform the functions noted above.

Scanner 220 may be any conventional flat-bed scanner with its cover removed, for example, a MICROTEK Scan-Maker II, a Hewlett Packard ScanJet IIC, an Apple Computer ColorOneScanner, or a scanner unit such as that illustrated in U.S. Pat. No. 4,879,604. The computer hardware may be the conventional IBM PC or compatible, used with ImageStar II software, or a Macintosh system used with Adobe Photoshop 3.0 software. For complex surface modelling and manufacturing applications, one may use AutoCAD Data Extension (ADE) software as an add-on program for AutoCAD Release 12.

In accordance with the invention, the conventional scanner 220 becomes usable with three dimensional objects such as object 204 by the presence of the duplicating or illumination box 222, which, when in the operative position shown in FIG. 2, reflects light directly downwardly and all around object 204 so that the optical system 236 guides light reflected from all surfaces of object 204 and the converter 234 produces signals which are representative of the three-dimensional characteristics of object 204.

In FIG. 1, duplicating box 222 is shown in the form of a cover pivoted directly on the frame of scanner 220. However, it is to be understood that the device 222 may be totally separate from the scanner 220 and may be simply placed on and off scanner 220 with its open bottom end overlying surface 226 and containing object 204.

The duplicating or illumination device 222 may be of any of the embodiments illustrated in FIGS. 6–14. The embodiment of FIG. 6 comprises a luminescent box 10 formed by side walls 12 and 14, front wall 16 and rear wall 18. The upper edges 20 of the walls define a top opening 21 and a domed lid 22 is pivotally connected by a hinge 23 to rear wall 18. Lid 22 has a pair of vertical side walls 24 and a semi-cylindrical top wall 25. In the closed position of the lid shown in FIG. 7, side walls 24 essentially align with side walls 12 and 14 and top wall 25 extends between front wall 16 and rear wall 18.

The walls 12, 14, 16 and 18 and lid 22 are preferably constructed of lightweight plastic material. The interior surfaces of walls 12, 14, 16, and 18 and of walls 24 and 25 of domed lid 22 are coated with a white, light reflective material to provide high intensity light within the box during the reproduction or scanning process.

Bottom wall 26 of box 10 is provided with a rectangular opening 28 which is covered by a transparent bottom plate 30 having soft thin pads 31 that may rest closely adjacent to or directly on the glass reproduction surface 226 of scanner 220 or of a conventional photocopying machine. Alternatively, opening 28 may be left open and a thin, clear, replaceable, disposable, vinyl sheet may be placed between bottom wall 26 and the glass surface of the scanner. If the sheet becomes scratched or otherwise marred, it is easily replaced by a new sheet.

Figure 7:
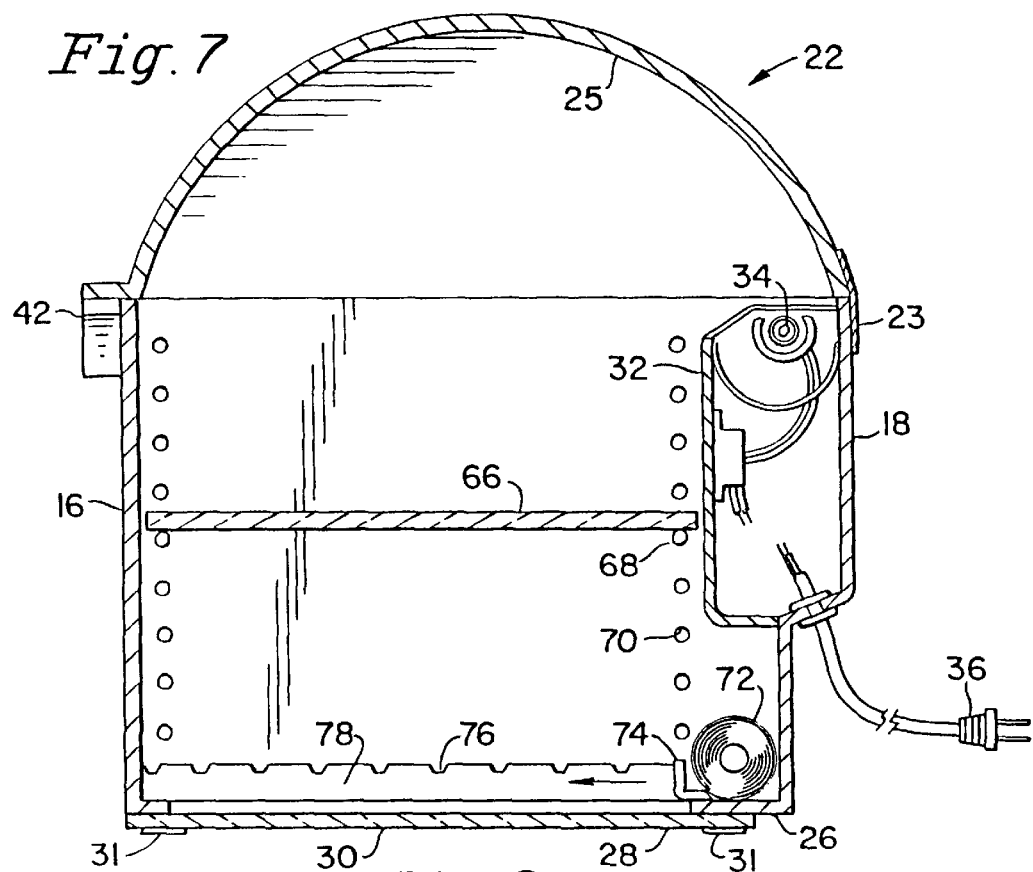

Mounted against the rear wall 18 is a light fixture assembly 32 containing a high intensity photolamp 34 which projects light upwardly against the reflective surface 25 of lid 22, with surface 25 then reflecting that light downwardly within the chamber 35 defined by space of walls 12, 14, 16 and 18 and lid 22 (FIG. 7).

Lamp 34 is powered from a conventional A.C. power source using a standard electrical outlet and plug 36. The lamp circuitry includes a conventional manually operated on/off switch 38 and a rheostat 40 to adjust the light intensity of lamp 34. The lamp circuitry also includes a safety interlock switch and latch 42 mounted at the top of front wall 16 and actuated by a latch element 44 on the front flange 46 of lid 22 when the lid is moved to its closed position shown in FIG. 7. When the lid 22 is open as in FIG. 6, switch 42 is opened and lamp 34 is deenergized. When the lid is moved to its closed position of FIG. 7 switch 42 is closed, lamp 34 is energized and the box is ready for use.

Figure 6:
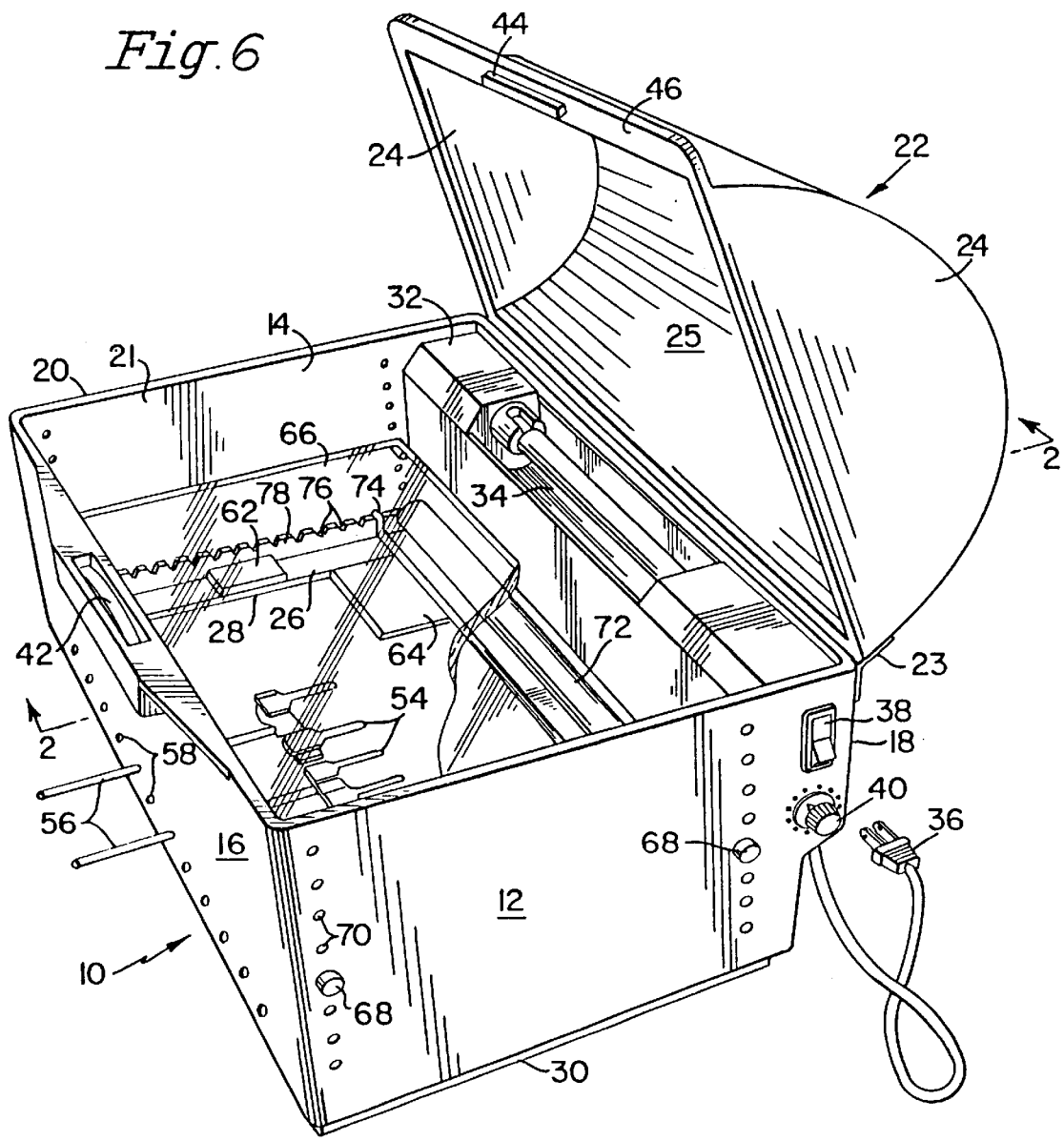

To use the box 10 in conjunction with scanner 220, the box is merely placed on the machine with its transparent bottom plate 30 overlying the glass reproduction surface 226. With the box properly positioned, the power supply circuit to lamp 34 properly energized, and the lid 22 in its open position as shown in FIG. 6, a three-dimensional object 204 such as the bolt 50 (FIG. 9) may be placed within chamber 35 directly on the top surface of transparent plate 30 and positioned as desired. Lid 22 is then closed to the position of FIG. 7 thereby closing switch 42 and lighting the high intensity lamp 34. Scanner 220 may then be operated in normal fashion moving unit 230 back & forth to quickly provide output signals from converter 234 which are representative of the image characteristics of the bolt.

Any three-dimensional object may be placed within box 10 on top of plate 30 and a number of two or three-dimensional reproductions or images of the various sides of that object may be obtained simply by turning that object and placing the desired side on plate 30.

Figure 9:
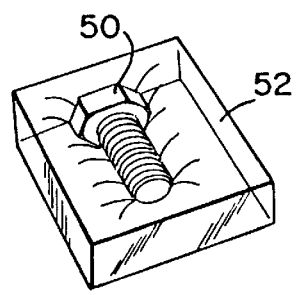

Instead of supporting the three-dimensional object 50 directly on plate 30 the object may be supported by various other means, for example, a clear gel pad 52 such as that shown in FIG. 9, or horizontally adjustable support elements 54 supported by rods 56 extending through openings 58 provided in one of the walls of the box, for example, front wall 16. For special applications transparent plastic fixtures resting on plate 30 may be used to support three-dimensional objects of special configuration.

Figure 8:
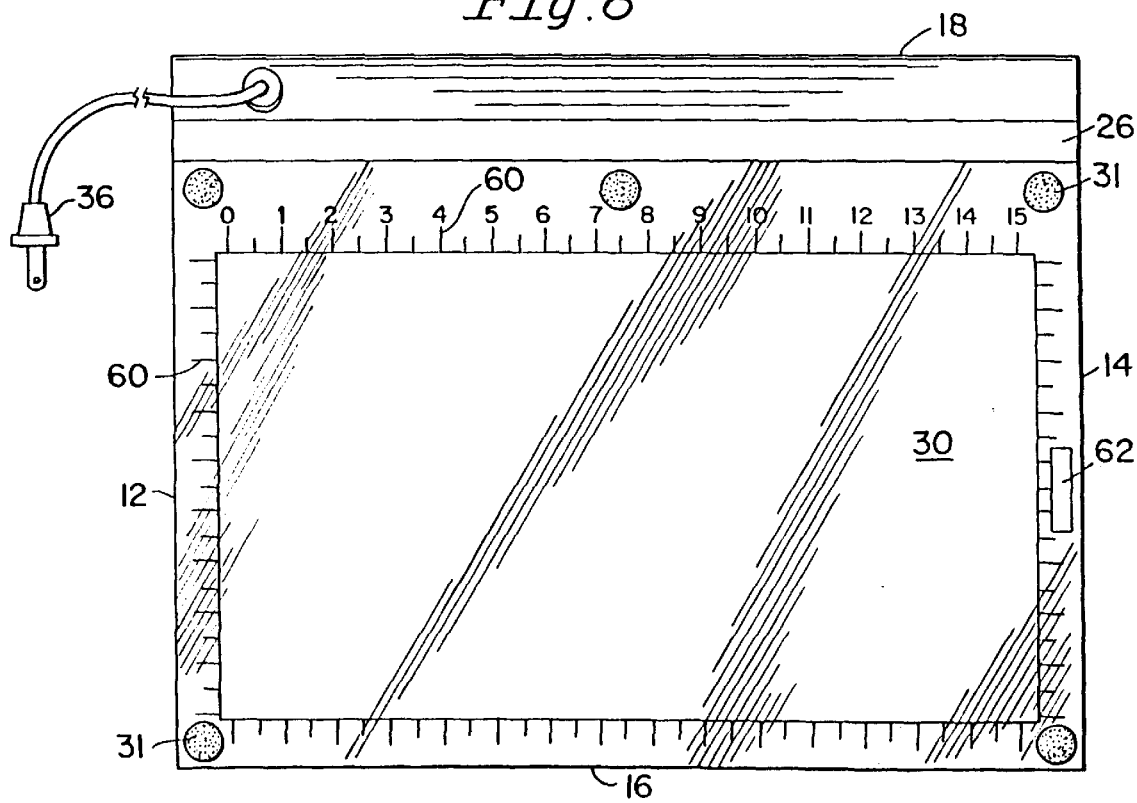

As shown in the bottom plan view of FIG. 8 calibration marks 60 are provided around the perimeter of bottom plate 30 to indicate the approximate size of the three-dimensional object being copied. In addition, a date/time clock 62 mounted on the inside surface of bottom wall 26 automatically indicates the date and time on which the two-dimensional reproduction was made. Similarly an I.D. card holder 64 may be placed within the box on top of plate 30 to provide identifying information.

For certain applications a removable transparent plate 66 may be inserted into the box at a selected height at which it is supported by removable dowel pins 68 passing through selected openings 70 in side walls 12 and 14. On this plate 66 various designs or backgrounds can be cast onto the resulting copy to provide a three-dimensional effect using the cast image as a background.

For some applications, plate 66 may be a magnification plate to enlarge the size of the object on the image which is produced.

For some applications it may be desirable to black out or white out a certain area of the reproduction surface. To accomplish this a black shade or a white shade may be pulled over part of the upper surface of plate 30 and maintained in that position by hooks 74 engaging in notches 76 of side bars 78 fixed against side walls 12 and 14.

While the luminescent box 10 as illustrated is of fixed rectangular shape, for example, having internal dimensions of 14 inches by 17 inches, it may be constructed with telescoping features to provide for adjustment and ease of handling.

Referring now to FIGS. 10 and 11, a second embodiment of the duplicating device 222 includes a unitary box 90 formed by upwardly and outwardly tapering front and rear walls 92 and 94, side walls 96 and 98, all of which join together with a top wall which converges upwardly and inwardly and is shaped as a semi-cylindrical dome or lid 100. Rear wall 94 is connected by a hinge 102 to a flat strip metal frame 104 which has a rectangular opening 106 underlying the bottom opening 101 of box 90 and adapted to overlie the glass surface 226. A front handle 108 facilitates the raising of box 90 from its operative position shown in full in FIG. 10 to its raised, inoperative position shown in phantom. A pair of gas springs, 110 and 112, limits the speed with which the box may be raised or lowered.

A high-intensity light source such as a 500 watt to 1,000 watt quartz bulb 114 is mounted centrally within the dome 100 and a thin vinyl or glass diffuser sheet or plate 116 is mounted within dome 100 between the light source 116 and the object receiving chamber 118 defined by walls 92, 94, 96 and 98. If necessary or desired, more than one light 114 may be provided within various locations of dome 100 and/or box 90.

As in the embodiment of FIG. 6, the interior surfaces of walls 92, 94, 96 and 98 and dome 100 are all light-reflective and this may be accomplished by highly polishing the surfaces, or coating them with a white, light-reflective material, or lining them with mirrored material.

In using box 90, the frame 104 may rest directly on the glass surface of scanner 220 or on a thin, clear, vinyl sheet covering and protecting the glass surface on the frame surrounding the surface.

When box 90 is being used with scanner 220, the three-dimensional object 204 will be located within chamber 118 and light from bulb 114 is deflected downwardly from the inner surface of dome 100 and diffused uniformly by diffuser plate 116 downwardly onto the object 204 being scanned.

Figure 12:
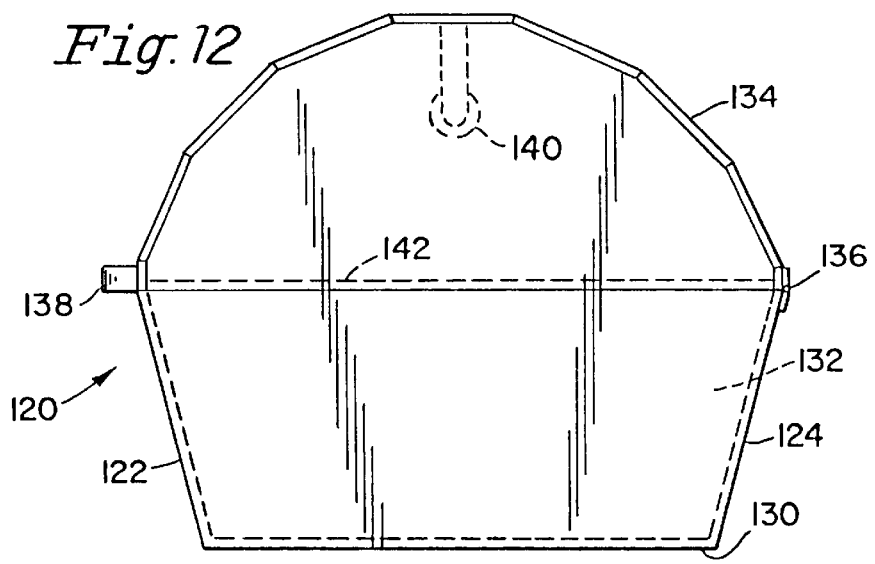
Figure 13:
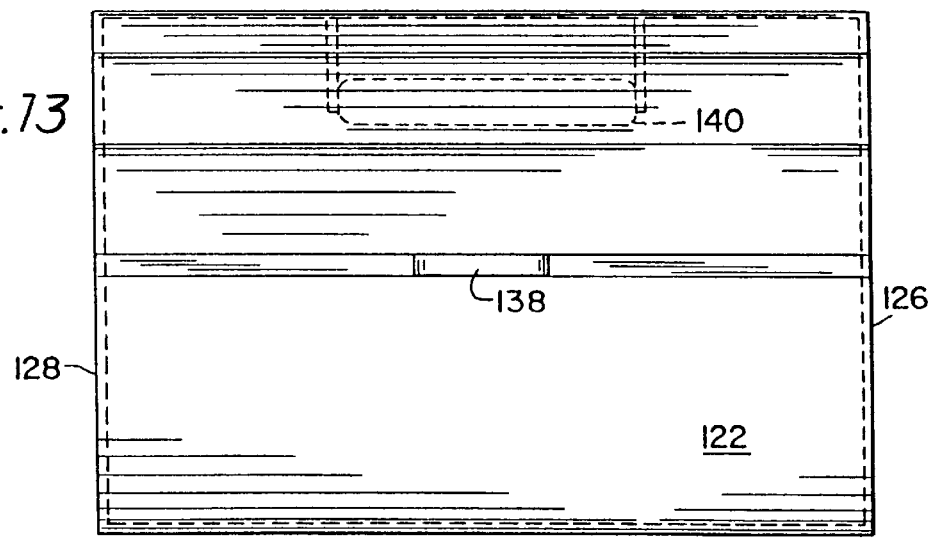

The embodiment of the invention illustrated in FIGS. 12 and 13 includes a luminescent box 120 formed by upwardly and outwardly tapering front and rear walls 122 and 124, sidewalls 126 and 128, with the box being open at its bottom or being closed by a transparent glass or vinyl sheet or plate 130 as described with respect to FIG. 6. Vertical walls 122, 124, 126 and 128 define an object receiving chamber 132 which is open at its upper end and is adapted to be closed by a top wall shaped as a generally semi-cylindrical dome or lid 134 which is pivotally connected by a hinge 136 to rear wall 124. Front handle 138 facilitates raising and lowering lid 134.

As in FIG. 10, a high-intensity quartz bulb 140 is centrally mounted within lid 134 and a diffuse sheet o plate 142 is mounted within lid 134 to diffuse the light passing from bulb 140 into chamber 132.

As in FIG. 10, the interior surfaces of dome 134 and vertical walls 122, 124, 126 and 128 are highly light-reflective.

Figure 14:
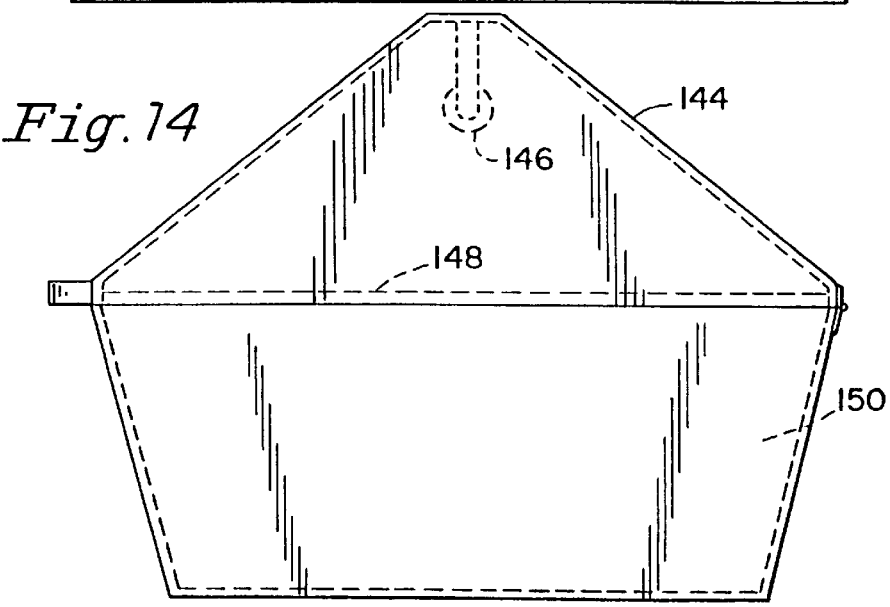

The embodiment of the duplicating box of the invention illustrated in FIG. 14 is essentially the same as that shown in FIGS. 12 and 13 except for the shape of the dome 144 which is of an upwardly and inwardly tapered or sloping configuration in contrast to the generally semi-cylindrical shape of the dome in FIGS. 10 and 12. As in the other embodiments, the dome includes a light source 146 and a diffuser plate 148 for providing high-intensity, uniform light downwardly onto an object located within chamber 150.

The various features described above with respect to the duplicating box of FIG. 6 may also be incorporated into the embodiments illustrated in FIGS. 10, 12 and 14.

Other modifications may be made to the various embodiments. For example, the effective vertical height of the boxes may be varied. In FIGS. 6, 12 and 14, this may be done by increasing or decreasing the vertical height of the side walls or by constructing those sidewalls in two pieces, with one piece being removable, or constructing those sidewalls in telescoping fashion so that the height is quickly and easily adjusted to accommodate objects 204 of various sizes. In the embodiment of FIG. 10, the vertical height of walls 92, 94, 96 and 98 may be varied to accommodate objects of various sizes.

In some devices, it may be desirable to provide a sidewall entry opening for hands or objects close to the bottom of the object receiving chamber. A flexible flame retardant curtain may be provided on the side wall over the side wall entry opening to conform around the object placed through the opening into the chamber. The curtain will contain the light within the chamber. This can be readily done in any of the embodiments described above. It may also be desirable to provide a viewing window through one of the sidewalls of the box in order to see that the object is properly positioned within the box. Instead of the pivotable lid as in FIGS. 6, 12, and 14, the lid may be fixed and a sidewall may be pivotable for access.

For some applications, the box may be formed by spaced vertical posts which support the light source above the reproduction surface 226 and side wall panels which are removable from the posts. The box may be then used with or without the sidewalls to provide a closed or open chamber within which the object is placed, and the light source spaced above the surface 226 will cast light directly down onto the object.

Different types of lamps 114, for example fluorescents or halogens, may be used and if necessary fan cooling systems may be provided to prevent excessive heat built up in device 222.

Depending on the type of lamp used, particularly halogen lamps which tend to produce light with excessive red tones, it may be necessary to provide color correction filters 240 between lamp 114 and diffuser 116 (FIGS. 4 and 5).

It is also desirable that scanner 220 be capable of scanning an object sized approximately 8 inches wide by 13 inches long (the approximate size of glass surface 226) and about 7 inches high. Conventional scanners which are intended to merely scan flat pieces of paper have a limited "depth of field" for example one to two inches above surface 226 within which the scanned images are maintained within reasonable focus. The imaging system employed herein enhances the depth of field of a conventional scanner and increases that depth of field above surface 226 to approximately 7 to 8 inches so that images of an object 204 having a height of about 7 inches are produced in clear focus.

One way of increasing that depth of field is to provide a compensating magnification plate over the entire top surface of glass 226 below the object 204. A second approach to increasing the depth of field is to provide a magnifying compensator plate within the optical reading unit 230 on top of the lens 232 so that the compensator plate 242 travels with unit 230 during the scanning operation (FIGS. 4 and 5).

A third method of increasing the depth of field is to close down or restrict the width of the lens aperture 244 within the lens stop 246 (FIGS. 4 and 5). This transmits and focuses the light from lens 232 a greater distance above glass surface 226 so that the entire height of object 204 will be scanned in reasonable focus.

When utilizing any of these methods for increasing the depth of field it is important to remember that the quality in scanning flat papers on the top of glass surface 226 be maintained so that the scanner system may be used in conventional fashion with those flat papers.

It is readily apparent that the scanner 202 as illustrated in FIGS. 1 and 2, and as incorporated in the imaging system illustrated in FIG. 3, advantageously provides an affordable, cost-effective system by which images of three-dimensional objects are instantly captured and then reproduced in two or three-dimensional form. The illumination device 222, when used in combination with a conventional flat-bed scanner 220 has the capability to capture text, transparency, and three-dimensional physical images using commercially available computer hardware and software and has application to a large number of uses. For example, in the design engineering industry, the system of FIGS. 1–3 captures images from a three-dimensional object for input into conventional computer hardware and software programs to create an accurate, detailed, three-dimensional design without the need for initially preparing two-dimensional drawings now required by a conventional flat-bed scanner. Similarly, in the multi-media and animation industry, the system of the invention immediately captures an image of an actual two or three-dimensional object as opposed to the currently conventional practice of scanning a series of two-dimensional drawings or photographs by use of a conventional flat-bed scanner. The same is true of the desktop publishing industry wherein two or three-dimensional images of a three-dimensional object are immediately captured by applicant's novel system for cataloguing or other customer service/marketing purposes.

In the automatic fingerprint identification system (AFIS) industry, the system of the invention immediately captures fingerprint images from a person's finger in an electronic/computer format for transmission, comparison, printing, or other purposes.

The system of the invention is also useful in the stereo imaging and microscopy industry. It produces an accurate three-dimensional image of a three-dimensional object to enable electronic image analysis for purposes of detecting defects and determining dimensions, or of categorizing defects by color, shape, size, etc., or of obtaining complex measurements including angular deviations, or of obtaining microsurface characteristics of the object.

The system may also be used to produce images from transparencies supported directly on top of glass plate 226 with the illumination device 222 providing plenty of light down through the transparency to produce high quality imagery from scanner 220.

As mentioned above, object 204 may be supported from the walls of illumination device 222 in a raised position above surface 226 by various type support or positioning elements such as clamps, fingers, rods, etc. (for example see elements 54 and 56 in FIG. 6). By turning and adjusting those positioning elements various sides of object 204 may be scanned by scanner 220 and those various images may then be coordinated by suitable software to produce any desirable three-dimensional output image.

These are just a few of the possible applications of the system of the invention, all of which are readily obtainable at affordable costs. As mentioned above, the system includes conventional computer hardware and software for transforming the signals from novel scanner 202 into three-dimensional output images or reproductions. However, in some applications, it is anticipated that specialized software will be developed and used with the hardware to correspond to the imaging characteristics of the novel scanner 202.

The system of the invention beneficially produces images which are of photo quality, three-dimensional appearance with depth, color and clarity. The system is communications friendly: smaller objects of complex shape for which there are no engineering drawings can be captured as electronic images. The system is expedient and economical in cost. Images are reproduced instantly as compared to time consuming, costly photography, drafting, stereo-lithography and the like. The images produced by the scanner may be electronically manipulated by enhancement software and publication or drafting formats. Three-dimensional objects as large as 8 inches wide by 13 inches long by 7 inches high may be conveniently scanned to produce clearly focused images which may then be used or manipulated in various ways as discussed above.

Thus it is readily apparent that the combination of the illumination device with an essentially conventional desk top scanner readily adapts that scanner for use with three-dimensional objects while retaining its conventional use with two-dimensional flat sheets or transparencies. The conventional desk top scanner now becomes a much more versitile and far more valuable tool.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An image reading apparatus for reading image data from a non-flat three-dimensional object comprising a frame, article support means mounted on said frame, reading means mounted on said frame on one side of said support means for movement along said support means, an illumination device located on an opposite side of said support means, said illumination device comprising a housing having vertical walls and a top wall defining an internal chamber with a bottom opening overlying said support means, said top wall having a light reflective inner surface, a light source mounted within said chamber for illuminating said chamber and emitting light against said light reflective inner surface, said light reflective inner surface reflecting light downwardly into said chamber and onto a three-dimensional object supported within said chamber adjacent said support means, whereby said reading means produces image output signals representative of the characteristics of the three dimensional object.

2. Apparatus as defined in claim 1, comprising light diffuser means mounted within said chamber beneath said light source.

3. Apparatus as defined in claim 1, comprising a viewing window in said vertical wall means.

4. Apparatus as defined in claim 1, comprising a side entry opening in said vertical wall means.

5. Apparatus as defined in claim 1, comprising positioning means connected to said wall means for supporting an object within said chamber.

6. An image reading apparatus as defined in claim 1, comprising color filter means mounted beneath said light source.

7. The apparatus as defined in claim 1, comprising means for enhancing the depth of field read by said reading means.

8. The apparatus defined in claim 1, the inside surfaces of said walls of said housing being light reflective.

9. The apparatus defined in claim 1, said top wall converging upwardly and inwardly from said vertical walls, and said light source being mounted adjacent said top wall.

10. The apparatus defined in claim 9, said top wall being a lid pivotally mounted to one of said vertical walls, and said light source being mounted on said lid.

11. The apparatus defined in claim 10, an electrical power circuit for said light source including switch means operable to energize said light source when said lid is closed and to deenergize said light source when said lid is opened.

12. The apparatus defined in claim 1, said top wall converging upwardly and inwardly from said vertical walls and said light source being mounted on said top wall, and light diffuser means mounted beneath said light source.

13. Apparatus as defined in claim 12, the inside surfaces of said walls being light reflective.

14. Apparatus as defined in claim 13, said top wall being a lid pivotally mounted to one of said vertical walls to open and close the top of said chamber.

15. Apparatus as defined in claim 14, said light diffuser means being mounted on lid.

16. An imaging system which includes the image-reading apparatus of claim 1, comprising computer-operated apparatus for receiving the signals from said reading means and thereafter producing two or three-dimensional reproductions of the three-dimensional object.

17. The imaging system of claim 16, said computer operated apparatus including software which corresponds to the characteristics of said illumination device.

18. An image reading apparatus for reading image data from a non-flat three-dimensional object comprising a frame, article support means mounted on said frame, reading means mounted on said frame on one side of said article support means for movement along said support means, an illumination device located on an opposite side of said article support means, said illumination device comprising a vertical support frame having a bottom opening overlying said article support means, a light source mounted on said vertical support frame and spaced from said article support means directing light downwardly onto a three-dimensional object supported adjacent said article support means, whereby said reading means produces image output signals representative of the characteristics of the three dimensional object.

19. Apparatus as defined in claim 18, comprising light diffuser means mounted on said support frame beneath said light source.

20. Apparatus as defined in claim 18, comprising positioning means connected to said support frame for supporting an object.

21. An image reading apparatus as defined in claim 18, comprising color filter means mounted beneath said light source.

22. Apparatus as defined in claim 18, comprising means for enhancing the depth of field read by said reading means.

23. An imaging system which includes the image-reading apparatus of claim 18, comprising computer-operated apparatus for receiving the signals from said reading means and thereafter producing two or three-dimensional reproductions of the three-dimensional object.

24. The apparatus defined in claim 18, said frame including removable side wall panels.

25. Apparatus as defined in claim 24, the inside surfaces of said wall panels being light reflective.

26. Illumination apparatus for use with a reproduction machine such as a scanner, photocopier, having an article support surface to provide a reproduction from a non-flat three-dimensional object, said apparatus comprising a vertical support frame having a bottom opening adapted to overly the article support surface of the machine, a light source mounted on said support frame and spaced from said article support surface directing light downwardly onto a three-dimensional object supported adjacent said article support surface, whereby said machine may be operated to provide a reproduction from a three-dimensional object.

27. Apparatus as defined in claim 26, comprising light diffuser means mounted on said support frame beneath said light source.

28. Apparatus as defined in claim 26, comprising positioning means connected to said support frame for supporting an object.

29. Apparatus as defined in claim 26, comprising color filter means mounted beneath said light source.

30. Apparatus as defined in claim 26, said frame including removable side wall panels.

31. Apparatus as defined in claim 26, the inside surfaces of said frame being light reflective.

* * * * *